(12) United States Patent
Shipley et al.

(10) Patent No.: US 8,687,616 B1
(45) Date of Patent: Apr. 1, 2014

(54) WIRELESS WIDE AREA NETWORK CHARACTERISTICS INDICATED OVER A WIRELESS LOCAL AREA NETWORK

(75) Inventors: Trevor Daniel Shipley, Olathe, KS (US); Jeremy R. Breau, Leawood, KS (US); Cesar Perez, Olathe, KS (US); Douglas Alan Olding, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 168 days.

(21) Appl. No.: 13/182,754

(22) Filed: Jul. 14, 2011

(51) Int. Cl.
*H04B 7/00* (2006.01)
*H04Q 7/20* (2006.01)

(52) U.S. Cl.
USPC .......................................................... 370/338

(58) Field of Classification Search
None
See application file for complete search history.

(56) References Cited

U.S. PATENT DOCUMENTS

| | | | |
|---|---|---|---|
| 7,400,901 B2 * | 7/2008 | Kostic et al. | 455/525 |
| 7,649,848 B1 | 1/2010 | Swan et al. | |
| 8,249,039 B2 * | 8/2012 | Kostic et al. | 370/338 |
| 2005/0197118 A1 | 9/2005 | Mitchell | |
| 2007/0008925 A1 * | 1/2007 | Dravida et al. | 370/331 |
| 2008/0005156 A1 | 1/2008 | Edwards et al. | |
| 2008/0014997 A1 | 1/2008 | Guthrie et al. | |
| 2008/0049787 A1 | 2/2008 | McNaughton et al. | |
| 2008/0080414 A1 | 4/2008 | Thubert et al. | |
| 2008/0084334 A1 | 4/2008 | Ballew | |
| 2008/0086320 A1 | 4/2008 | Ballew et al. | |
| 2008/0086508 A1 | 4/2008 | Ballew | |
| 2008/0090575 A1 | 4/2008 | Barak et al. | |
| 2009/0310555 A1 | 12/2009 | Huo et al. | |
| 2010/0278146 A1 * | 11/2010 | Aoyama et al. | 370/331 |
| 2011/0110300 A1 * | 5/2011 | Sachs et al. | 370/328 |
| 2012/0093009 A1 * | 4/2012 | Wang et al. | 370/252 |

* cited by examiner

*Primary Examiner* — Hassan Phillips
*Assistant Examiner* — Omeed D Rahgozar (57) ABSTRACT

What is disclosed is a method of operating a communications system. The method includes transferring a wireless local area network (WLAN) beacon signal from a wireless transceiver, where the WLAN beacon signal comprises packets identifying the WLAN. The method further provides receiving wireless wide area network (WWAN) signals into the wireless transceiver and determining WWAN characteristics. The WWAN characteristics comprise at least one of signal strength, data rate, and transceiver battery status. The method further includes, in the wireless transceiver, inserting a characteristic indicator into the packet headers of the WLAN beacon signal indicating the WWAN characteristics.

20 Claims, 7 Drawing Sheets

WIRELESS WIDE AREA NETWORK CHARACTERISTICS INDICATED OVER A WIRELESS LOCAL AREA NETWORK

TECHNICAL FIELD

Aspects of the disclosure are related to the field of wireless networks and wireless communications, and in particular, information delivery to user devices on a wireless local area network access point.

TECHNICAL BACKGROUND

Wireless user devices, such as computers, smartphones, gaming devices, or other devices, are typically able to connect to communication services, such as Internet services, through wireless transceiver devices. These transceivers provide a wireless local area network for the user devices to communicate with the transceiver devices and also to access communication services. Wireless local area networks can include Wi-Fi-style local area wireless networks, among other examples. Wireless transceiver devices can include a router, gateway, or bridge functionality to connect user devices on the provided local area networks to other networks and systems, such as the Internet or other packet networks.

In some examples, wireless transceiver devices also include radio equipment for bridging communications of the local area network through a second wireless communication system, such as through a base station of a cellular communication system. Generally, wireless user devices operating on the wireless local area network do not have information about the second wireless connection.

Overview

What is disclosed is a method of operating a communications system. The method includes transferring a wireless local area network (WLAN) beacon signal from a wireless device, where the WLAN beacon signal comprises packets identifying the WLAN. The method further includes receiving wireless wide area network (WWAN) signals into the wireless device and determining WWAN characteristics in the wireless device. The characteristics could include signal strength, data rate, or transceiver battery status. The method further includes, in the wireless device, inserting a characteristic indicator into packet headers of the WLAN beacon signal indicating the WWAN characteristics.

What is also disclosed is a wireless device. The wireless device includes a network interface configured to receive wireless wide area network (WWAN) signals and a local interface configured to transfer a wireless local area network (WLAN) beacon signal. The WLAN beacon signal comprises packets identifying the WLAN. The wireless device further includes a processing system configured to obtain WWAN characteristics, including at least one of signal strength, data rate, or transceiver battery status. The processing system is also configured to insert a characteristic indicator into the packets of the WWAN beacon signal indicating the WWAN characteristics.

DETAILED DESCRIPTION

Figure 1:
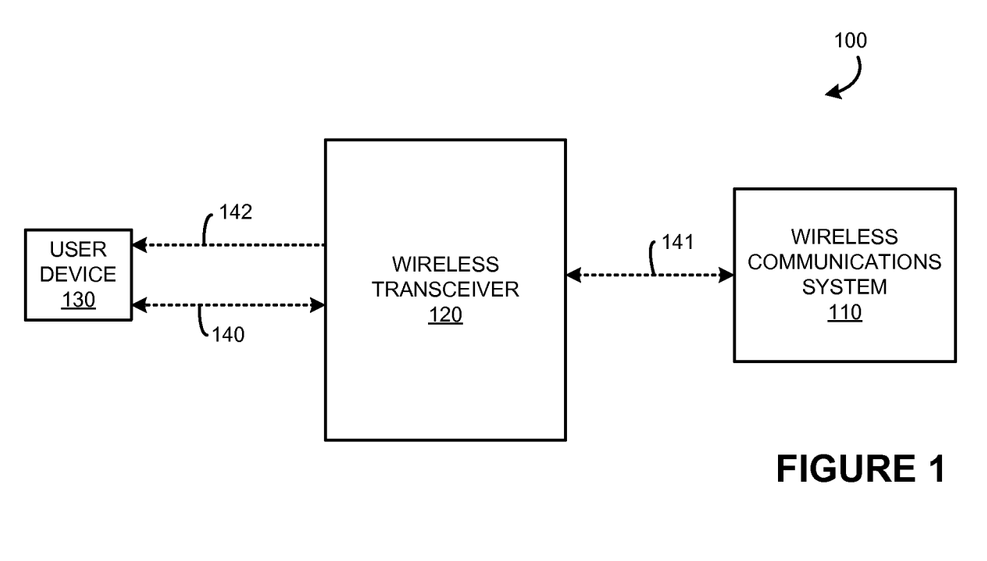
FIG. 1 is a system diagram illustrating a communication system.

FIG. 1 is a system diagram illustrating communication system 100. Communication system 100 includes wireless communication system 110, wireless device 120, and user device 130. User device 130 and wireless device 120 exchange communication signals 140. Wireless device 120 transmits beacon packet signals 142. Possible recipients of the beacon packet signals 142 include user device 130. However, the beacon packet signals 142 may be transmitted without regard to potential recipients. Wireless communication system 110 and wireless device 120 exchange wireless communication signals 141. In the example shown in FIG. 1, wireless device 120 can provide a wireless local area network for user devices, such as user device 130. Through wireless device 120, user device 130 can access communication services provided by wireless communication system 110, or communicate over wireless communication system 110. Although one user device is shown in FIG. 1, it should be understood that more than one user device could be included.

Figure 2:
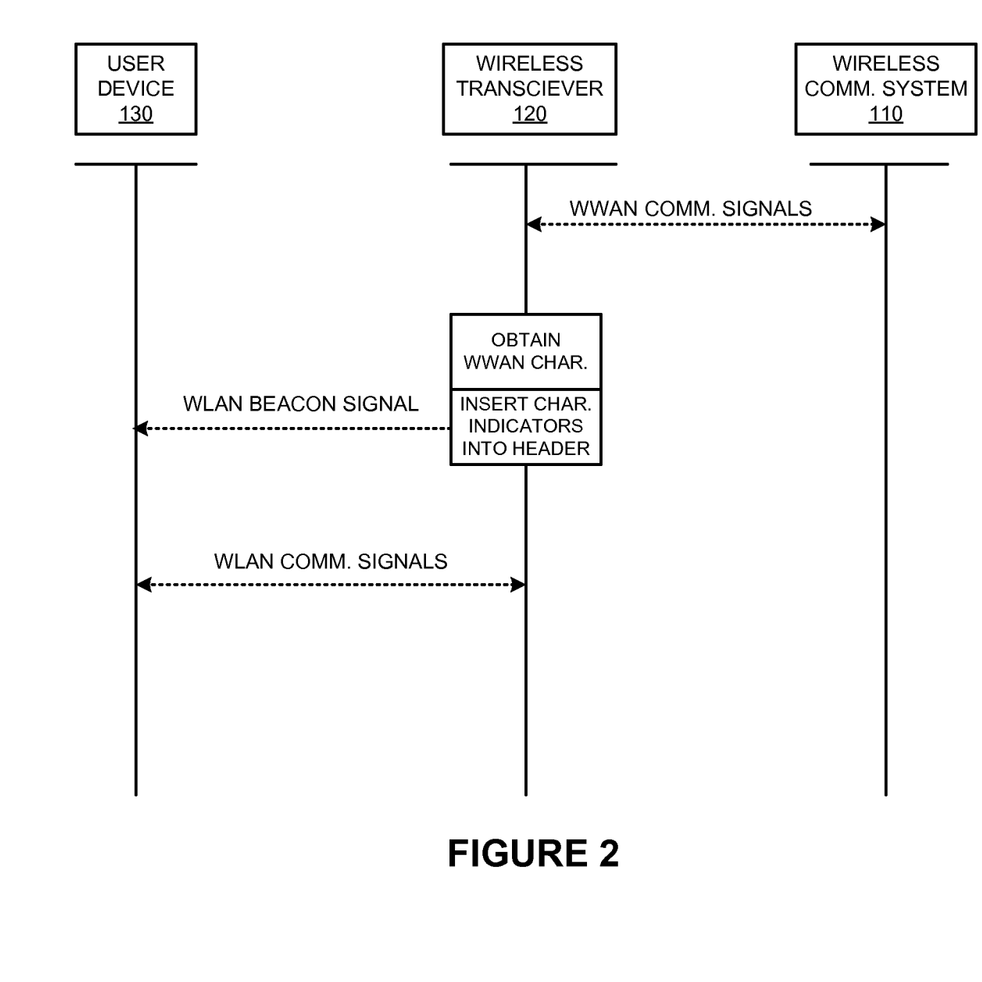
FIG. 2 is a sequence diagram illustrating a method of operation of a communication system.

FIG. 2 is a sequence diagram illustrating a method of operation of communication system 100. In FIG. 2, wireless communication system 110 exchanges Wireless Wide Area Network (hereinafter "WWAN") communication signals 141 with wireless device 120. In this example, WWAN communications signals 141 traverse a wireless medium. Wireless device 120 exchanges Wireless Local Area Network (hereinafter "WLAN") communication signals 141 with user device 130. In this example, WLAN communication signals traverse a wireless medium. WLAN communication signals 140 could comprise an IEEE 802.11 WLAN link, although other WLANs could be employed. The wireless device 120 transmits WLAN beacon signals 142 that comprise packets identifying the WLAN. User device 130 receives WLAN beacon signals 142.

Characteristic information could be associated with the WWAN, wireless device 120, or WWAN link 141, such as battery status of wireless device 120, signal strength, and data rate, among other information. The characteristic information could be determined by wireless device 120. Wireless device 120 indicates the characteristic information to user device 130 by inserting characteristic indicators into WLAN beacon signal 142 packet headers.

Figure 3:
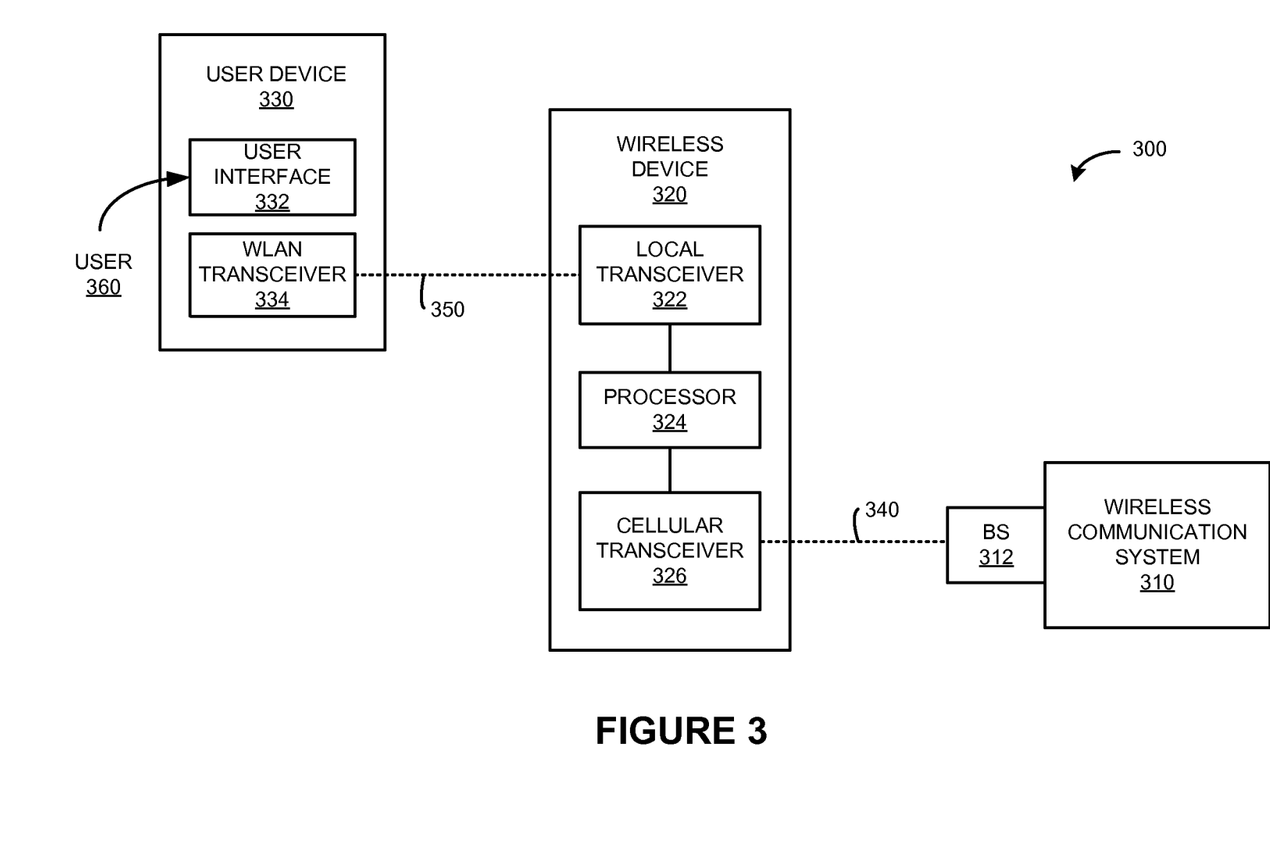
FIG. 3 is a system diagram illustrating a communication system.

FIG. 3 is a system diagram illustrating communication system 300. Communication system 300 includes wireless communication system 310, base station (BS) 312, wireless device 320, and user device 330. Wireless device 320 and user device 330 communicate over wireless link 350. In this example, wireless link 350 could comprise an IEEE 802.11 WLAN, such as a Wireless Fidelity (Wi-Fi) network. Although FIG. 3 shows an individual link 350 to user device 330, it should be understood that this link is merely representative of WLAN communications between user device 330 and wireless device 320. Also, FIG. 3 shows only a single user device 330. However, it should be understood that more than one user device could be included. Wireless device 320 and base station 312 communicate over wireless link 340. In this example, wireless link 340 comprises a 3GPP Long Term Evolution (LTE) link for exchanging user communications associated with user device 330, and could also include single-carrier radio transmission technology link (1xRTT) portions for exchanging overhead communications over wireless link 340.

In FIG. 3, wireless device 320 includes local transceiver 322, processor 324, and cellular transceiver 326. Wireless device 320 may include a database, operating system, logs, utilities, drivers, and networking software portions. In one example, wireless device 320 is a cellular phone. Cellular transceiver 326 communicates over a cellular communication link, such as with base station 312 of wireless communication system 310. Cellular transceiver 326 receives WWAN communication signals 340 into the wireless device 320. Processor 324 determines characteristics of the WWAN, including signal strength, data rate, and battery status of wireless device 320. Local transceiver 322 provides the WLAN associated with wireless link 350 to user devices, such as user device 330. Local transceiver 322 includes network transceiver, routing, and gateway equipment for exchanging communications over a WLAN and routing the WLAN communications over wireless link 350.

User device 330 includes user interface 332 and WLAN transceiver 334. In this example, user device 330 comprises a computing device and could comprise a computer, wireless smartphone, gaming device, or other user equipment capable of communicating over a WLAN. User device 330 receives WLAN signals that include beacon packets through WLAN transceiver 334. User device 330 may include software that can be executed to process the beacon packets and graphically display WWAN characteristics on user interface 332. User interface 332 could include a screen, touchscreen, keyboard, indicator lights, among other user interface equipment.

Base station 312 comprises RF communication and control circuitry, antenna elements, and communication routing equipment and systems. The RF communication circuitry typically includes amplifiers, filters, RF modulators, transceivers, and signal processing circuitry. Base station 312 also includes equipment to communicate with wireless communication devices, such as wireless device 320, over wireless link 340. Base station 312 may route communications between wireless communication system 310 and wireless communication devices such as wireless device 320, receive registration requests from wireless communication devices to establish wireless links, or provide network information, handoff information, or configuration information to wireless communication devices, among other operations.

Wireless communication system 310 includes equipment, including base station 312, to provide wireless access to communication services within different geographic coverage areas to wireless communication devices and route communications of the communication services to and from wireless communication devices through base stations. Wireless communication system 310 may also comprise further base stations, base transceiver stations (BTS), base station controllers (BSC), mobile switching centers (MSC), radio node controllers (RNC), call processing systems, authentication, authorization and accounting (AAA) equipment, access service network gateways (ASN-GW), packet data switching nodes (PDSN), home agents (HA), General Packet Radio Service (GPRS) support nodes, Internet access nodes, telephony service nodes, wireless data access points, or other wireless communication equipment.

Figure 4:
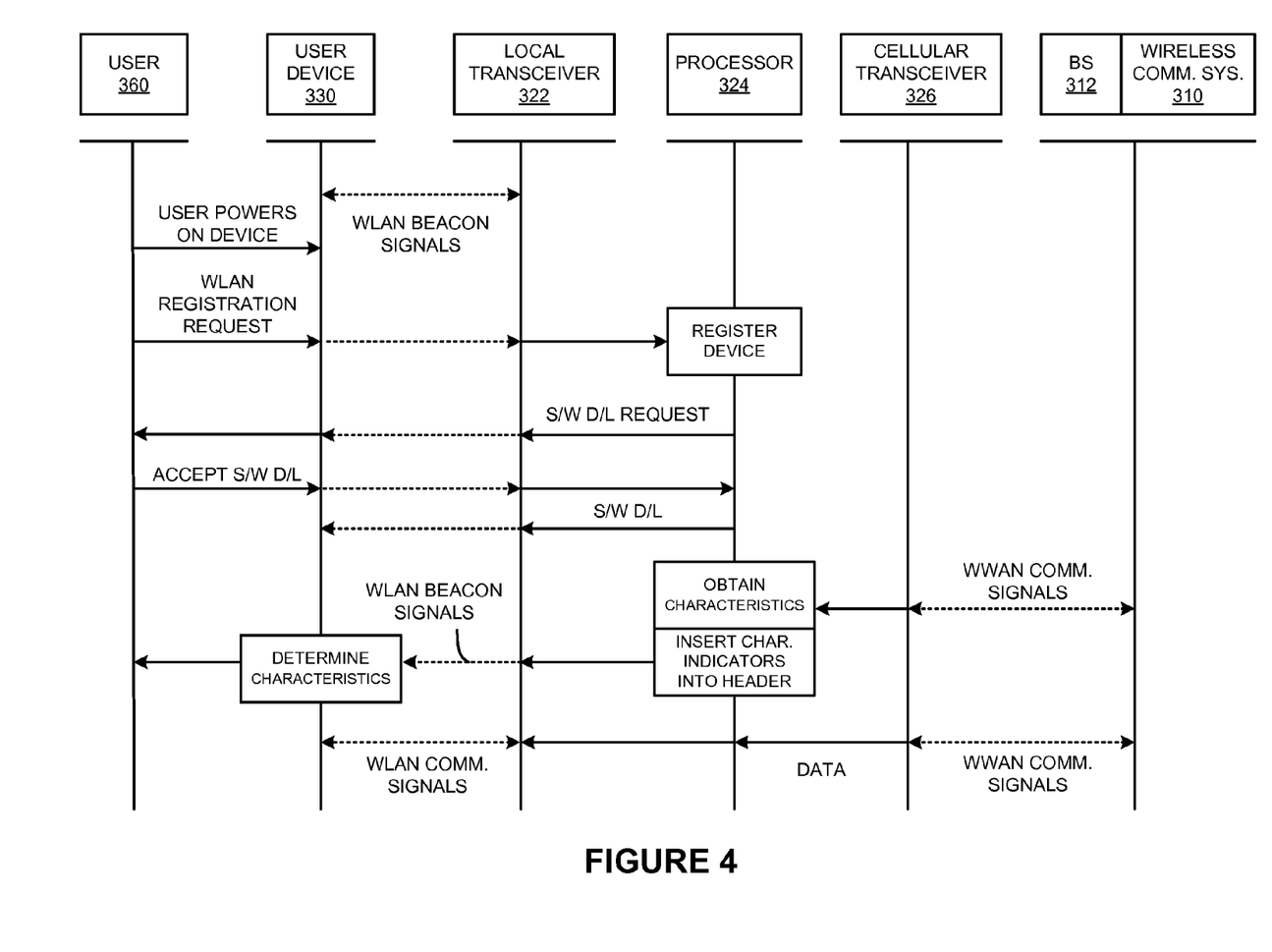
FIG. 4 is a sequence diagram illustrating a method of operation of a communication system.

FIG. 4 is a sequence diagram illustrating a method of operation of communication system 300. In FIG. 4, local transceiver 322 provides a WLAN to communication devices capable of receiving WLAN communications, which includes a WLAN beacon signal in this example. In this example, wireless link 350 represents a WLAN link. The WLAN beacon signal includes packets identifying the WLAN, among other information. When an operator of user device 330, such as user 360, powers on user device 330, user device 330 receives the WLAN communications, including the WLAN beacon signal, into user device 330 through WLAN transceiver 334. Local transceiver 322 also can exchange the WWAN communications, or a portion thereof, in WLAN communications over WLAN link 350 to communication devices capable of receiving WLAN communications. In FIG. 4, the WLAN communications and the WWAN communications could be transferred throughout the operations of FIG. 4, such as when other user devices are communicating over the WLAN.

User 360 may request a WLAN registration request with wireless device 320 over wireless link 350. Local transceiver 322 receives the WLAN registration request. After receiving the WLAN registration request, local transceiver 322 transfers the request to processor 324. Processor 324 processes the WLAN registration request and registers user device 330. In response to the WLAN registration request, processor 324 may also send a request to user device 330 through local transceiver 322 over WLAN link 350 requesting that user device 330 download (D/L) software. User device 330 receives the software download request through WLAN transceiver 334. The request is processed and may be displayed on user interface 332 for user 360 to view. In this example, user 360 accepts the software download on user device 330. The message indicating user 360 accepts the software download is transferred from WLAN transceiver 334 over the WLAN link 350, received into local transceiver 322, and transferred to the processor 324. In response to the indication of acceptance, processor 324 formats a message including the software and addressing information, and transfers the message to local transceiver 322. Local transceiver 322 transfers the message to user device 330 over WLAN link 350, and the message is received into WLAN transceiver 334. Upon receipt of the message, user device 330 processes the message and installs the software on user device 330.

During and after the software transfer, cellular transceiver 326 receives WWAN communications over WWAN link 340. The signals are transferred to processor 324. Processor 324 is configured to determine characteristic information associated with the WWAN or wireless device 320 for delivery to user device 330. In one example, processor 324 could derive wireless device 320 battery status from battery and associated power circuitry in wireless device 320, such as when wireless device 320 is a portable device. Wireless device 320 could also include radio-frequency signal strength determining circuitry or other functionality or circuitry from which processor 324 could derive WWAN characteristics or other characteristics of the communications associated with WWAN link 340 or equipment status of portions of wireless device 320.

Processor 324 is configured to determine and process the characteristic information and format the characteristic information into characteristic indicators. The processor 324 formats the characteristic indicators in an appropriate format for transfer to user devices on the WLAN, such as in a packet format, IP packet format, transmission control protocol (TCP) packet format, Ethernet data format, web page, javascript format, or hypertext markup language (HTML) format, among other formats. In an example, the processor 324 inserts the characteristic indicators into headers of the beacon signal packets of the WLAN. In a further example, processor 324 can determine WLAN characteristics to be formatted for delivery to user device 330 in a beacon signal packet.

Once formatted, processor 324 transfers the beacon signal packets to local transceiver 322. Local transceiver 322 transfers the beacon packets comprising the characteristic indicators over WLAN link 340. The beacon packet signals may comprise media access control (MAC) layer packets, user datagram protocol (UDP) packets, among other packet formats. User device 330 receives the WLAN communications, including the beacon packets, into WLAN transceiver 334. In response to receiving the packets, WLAN transceiver 334 transfers the packets to the software portion of user device 330 that was previously downloaded over WLAN link 340. The software processes the beacon signal packet headers and graphically displays the characteristic information on user interface 334 of user device 330. The displayed characteristic information provides information to user 360 about the status of the WWAN or wireless device 320, including a low battery of wireless device 320. The software may also determine and process WLAN characteristics, such as WLAN signal strength. In this example, user device 330 may be capable of graphically displaying both the WLAN signal strength and the WWAN signal strength on the same display or graphical user interface elements on user interface 334.

Base station 312 exchanges WWAN communications over wireless link 340. In this example, wireless link 340 represents a WWAN link for exchanging WWAN communications. The WWAN communications are received into cellular transceiver 326 of wireless device 320. Cellular transceiver 326 transfers the WWAN communications, or associated data, to processor 324 for processing. Processor 324 transfers the WWAN communications, or a portion thereof, for delivery to local transceiver 322. The WWAN communications, as processed and transferred by processor 324, are received into local transceiver 322. Local transceiver 322 also can exchange the WWAN communications, or a portion thereof, in WLAN communications over WLAN link 350 to communication devices capable of receiving WLAN communications. The WLAN communications and the WWAN communications could be transferred throughout the operations of FIG. 4, such as when other user devices are communicating over the WLAN.

Figure 5:
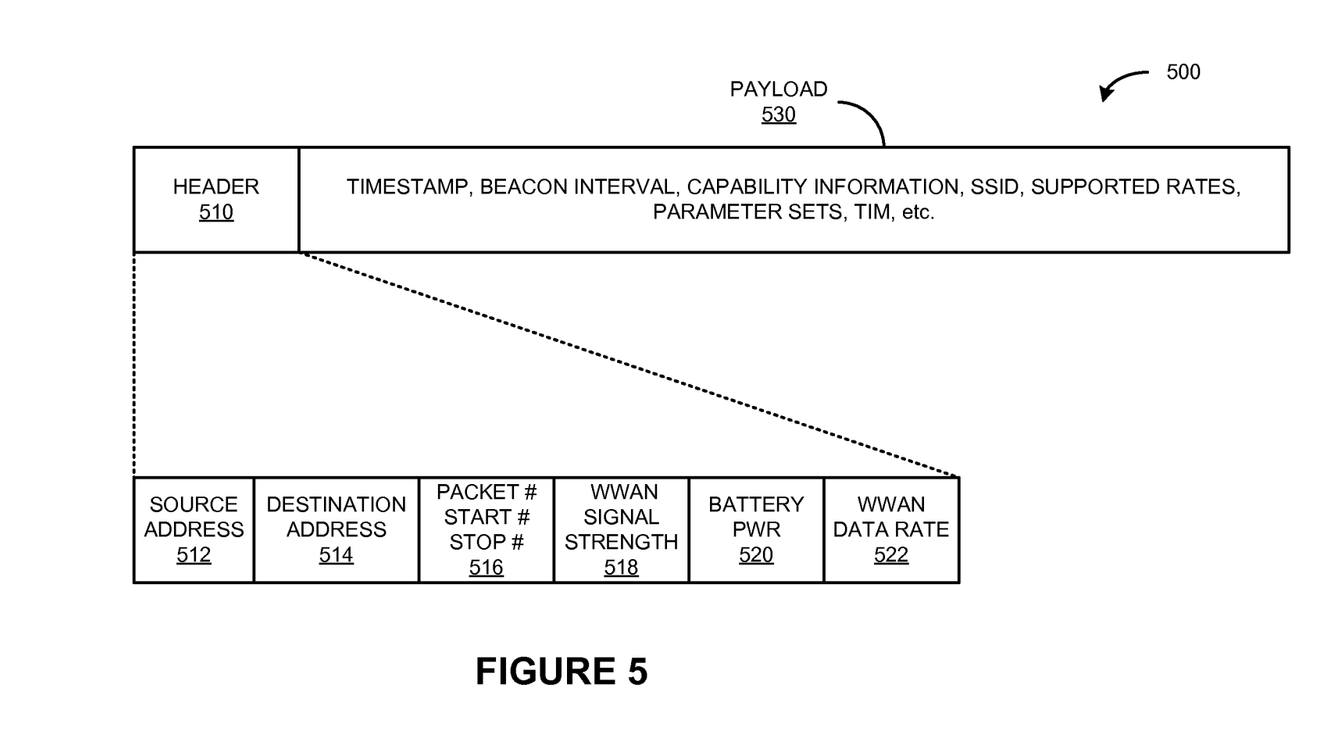
FIG. 5 is a block diagram illustrating an example beacon packet.

FIG. 5 is a block diagram illustrating a beacon packet 500. In FIG. 5, the beacon packet is representative of an 802.11 beacon packet. It should be understood that beacon packet 500 could be structured in various ways, and be of a different type of packet than an 802.11 beacon packet. In this example, beacon packet 500 includes header 510 and payload 530. Header 510 includes source address 512, destination address 514, packet number information 516, WWAN signal strength 518, battery power 520, and WWAN data rate 522. In this example, the available bytes are distributed among the source address, destination address, packet ordering information, WWAN signal strength, battery power, WWAN data rate. In another example, WWAN characteristic indicator data could be reported less often, freeing up space in the beacon packet header to allow other characteristics to be reported. For example, battery power, WWAN signal strength, and WWAN data rate could use the same field and change at set intervals. Payload 530 may include timestamp, beacon interval, capability information, service set identifiers (SSID), supported rates, parameter sets, and traffic indication map (TIM).

Figure 6:
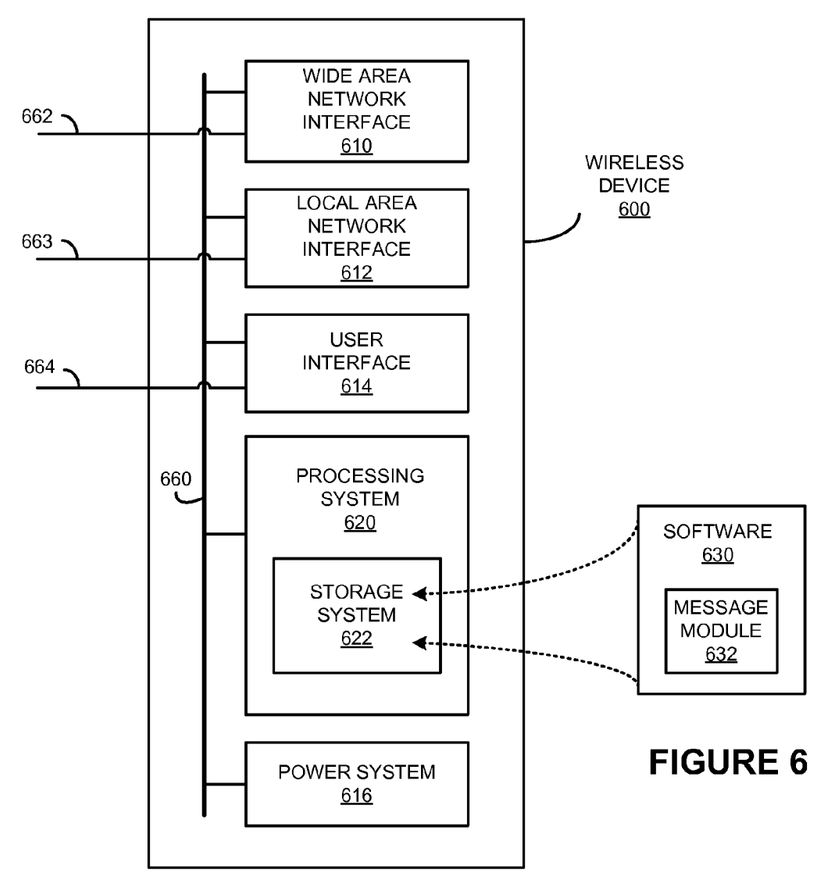
FIG. 6 is a block diagram illustrating a wireless transceiver device.

FIG. 6 is a block diagram illustrating wireless device 600, as an example of wireless device 120 found in FIG. 1 or wireless device 320 found in FIG. 3, although wireless devices 120 and 320 could use other configurations. Wireless device 600 includes wide area network interface 610, local area network interface 612, user interface 614, processing system 620, and power system 616. Wide area network interface 610, local area network interface 612, user interface 614, processing system 620, and power system 616 each communicate over bus 660. Wireless device 600 may be distributed among multiple devices that together form the various illustrated elements of wireless device 600.

Wide area network interface 610 comprises communication equipment for communicating over link 662, such as transferring content requests, receiving content, routing packet communications, communicating over a packet network, and communicating with a wireless communication system, among other equipment. In some examples, wide area network interface 610 comprises a wireless communication device, such as a cellular data communication device, and includes RF communication and control circuitry, and antenna elements. Wide area network interface 610 also receives command and control information and instructions from processing system 620 over bus 660. Link 662 could use various protocols or communication formats as described herein for WWAN links 141 or 340, including combinations, variations, or improvements thereof.

Local area network interface 612 comprises RF communication and control circuitry, antenna elements, and communication routing equipment and systems. The RF communication circuitry typically includes amplifiers, filters, RF modulators, transceivers, and signal processing circuitry. In many examples, local area network interface 612 includes circuitry and equipment to provide a wireless local area network to user devices, route user communications between network interface 610 and user devices over wireless link 663 and bus 660, transfer software to user devices, and send signals that include characteristic indicators, among other operations. Wireless link 663 could use various protocols or communication formats as described herein for WLAN links 140 or 350, including combinations, variations, or improvements thereof.

User interface 614 comprises an interface for a user or operator of wireless device 600 to transfer messages for delivery to user devices associated with wireless device 600. In some examples, user interface 614 is incorporated into the elements of local area network interface 612, wide area network interface 610, or processing system 620, and is configured to allow a user device communicating over wireless link 662 to transfer a message for delivery to other user devices. In an example, user interface 614 includes a user interface system, such as a display, human input device, or other user interface to allow a user or operator of wireless device 600 to enter a message for delivery to user devices associated with wireless link 663. In further examples, user interface 614 provides a software or web-based user interface over link 664. A combination of software and human interface device interfaces could comprise user interface 614. Link 664 could be incorporated into wireless link 662 or wireless link 663 in some examples, or comprise a portion of wireless link 662 or wireless link 663. Link 664 could use various protocols or communication formats as described herein for links 140-141 or 340 or 350, including combinations, variations, or improvements thereof.

Processing system 620 includes storage system 622. Processing system 620 retrieves and executes software 630 from storage system 622. In some examples, processing system 620 is located within the same equipment in which wide area network interface 610, local area network interface 612, user interface 614 or power system 616 are located. In further examples, processing system 620 comprises specialized circuitry, and software 630 or storage system 622 could be included in the specialized circuitry to operate processing system 620 as described herein. Storage system 622 could include a non-transitory computer-readable medium such as a disk, tape, integrated circuit, server, or some other memory device, and also may be distributed among multiple memory devices.

Software 630 may include an operating system, logs, utilities, drivers, networking software, and other software typically loaded onto a computer system. Software 630 could contain application programs, web server software, firmware, or some other form of computer-readable processing instructions. When executed by processing system 620, software 630 directs processing system 620 to operate as described herein, such as establish and control a WLAN, control the various intefaces of wireless device 600, determine device status of wireless device 600 including battery status, determine WWAN characteristics, determine messages for delivery to user devices such as software downloads, among other operations.

In this example, software 630 includes message module 632. It should be understood that a different configuration could be employed, and individual modules of software 630 could be included in different equipment than wireless device 600. Message module 630 determines messages, such as software downloads, for delivery to user devices associated with wireless device 600. In some examples, message module 632 monitors device status or equipment status for wireless device 600 and determines messages for user devices based on the device or equipment status. In an example, message module 632 could determine and process status of power system 616, such as a battery level status, and determine a message based on the battery level status. In another example, message module 632 could determine other WWAN characteristics such as data rate by monitoring traffic throughput. In a further example, message module could determine WWAN signal strength. Message module 632 could convert the WWAN characteristics into numbers representing the characteristic that can be interpreted by a user device and graphically represented. In an example, a characteristic indicator of the WWAN signal strength may include a number from 1 to 8, with 8 indicating that the WWAN signal strength is high. Message module may also determine and process WLAN characteristics such as signal strength. Message module 632 formats the messages for delivery to user devices, such as packetizing, determining addresses for packets associated with the messages, or determining web page content to present the messages to user devices. In an example, message module 632 formats characteristic information into characteristic indicators and inserts the characteristic indicators into beacon signal packet headers. The characteristic indicators may be reported in the beacon signal packet headers at different intervals. In an example, signal strength could be an element included in every beacon signal packet header, or signal strength could be sampled after set intervals and included in the header after the sampling. In a further example, message module 632 could process and determine the WWAN characteristics and report an average of each characteristic at the scheduled time or frame.

As an alternative to inserting characteristic indicators into beacon signal headers, message module 632 could change the calculations used to fill in information contained in existing or standardized beacon packet elements such as the Supported Rates element, and insert the characteristic information into the existing beacon packet elements based on the changed calculations. The changed calculations could be determined so as to encode the characteristic information in the existing beacon packet elements, where a user device receiving the encoded characteristic information could decode the encoded characteristic information for subsequent interpretation and display to a user of the user device.

Message module 632 also responds to user device requests such as user WLAN registration requests. In response to registration requests, message module transfers a message through the local area network interface 612 to a user device requesting that the user download software to the user device. In response to a user accepting the software download, message module 632 identifies and locates the software to be transferred to the user device and formats a message comprising the software to be delivered to the user device through the local area network interface 612. In some examples, the software to be transferred to the user device is stored in storage system 622. In other examples, the software to be transferred to the user device is received over one of links 662-664.

Power system 616 includes circuitry and a power source to provide power to the elements of wireless device 600. The power source could include a battery, solar cell, spring, flywheel, capacitor, thermoelectric generator, chemical power source, dynamo, or other power source. In some examples, power system 616 receives power from an external source, such as a wall outlet. Power system 616 also includes circuitry to condition, monitor, and distribute electrical power to the elements of wireless device 600.

Bus 660 comprises a physical, logical, or virtual communication link, capable of communicating data, control signals, power, and communications, along with other information. In some examples, bus 660 is encapsulated within the elements of wide area network interface 610, local area network interface 612, user interface 614, processing system 620, or power system 616, and may be a software or logical link, apart from the associated power elements. In other examples, bus 660 includes various communication media, such as air, space, metal, optical fiber, or some other signal propagation path, including combinations thereof. Bus 660 could be a direct link or might include various equipment, intermediate components, systems, and networks.

Figure 7:
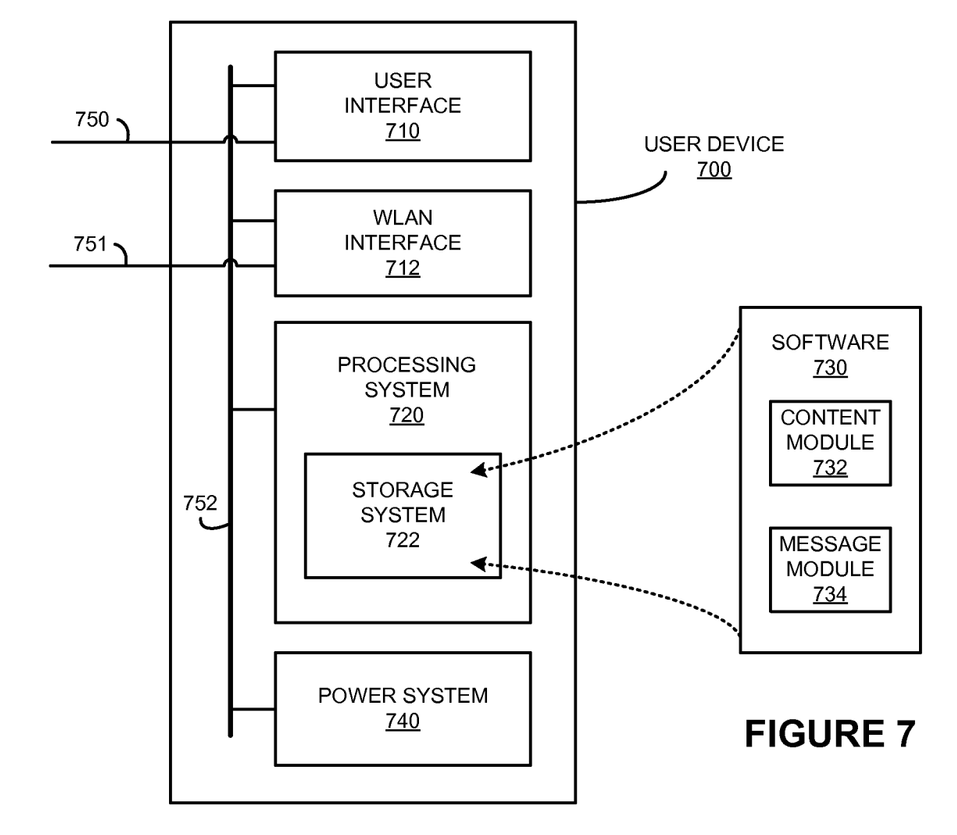
FIG. 7 is a block diagram illustrating a user device.

FIG. 7 is a block diagram illustrating user device 700, as an example of user device 130 found in FIG. 1 or user device 330 found in FIG. 3, although user devices 130 and 330 could use other configurations. User device 700 includes user interface 710, WLAN interface 712, processing system 720, and power system 740. User interface 710, WLAN interface 712, processing system 720, and power system 740 communication over bus 752. User device 700 may be distributed among multiple devices that together form the various illustrated elements of user device 700.

User interface 710 comprises an interface for a user or operator of user device 700 to control the operations of user device 700. In some examples, user device 700 is incorporated into the elements of WLAN interface 712 or processing system 720 and is configured to communicate over wireless link 750. In other examples, user interface 710 includes a user interface system, such as a display, human input device, keyboard, touchscreen, or other user interface elements. In further examples, user interface 710 provides a software or web-based user interface over link 750. A combination of software and human interface device interfaces could comprise user interface 710. Link 750 could be incorporated into wireless link 751 in some examples, or comprise a portion of wireless link 751. Link 750 could use various protocols or communication formats as described herein for links 140 or 350, including combinations, variations, or improvements thereof.

WLAN interface 712 comprises RF communication and control circuitry, antenna elements, and communication routing equipment and systems. The RF communication circuitry typically includes amplifiers, filters, RF modulators, transceivers, and signal processing circuitry. In many examples, WLAN interface 712 includes circuitry and equipment to exchange communications with over wireless link 751 and bus 752, transfer requests for WLAN registration, and receive WLAN communications, some of which may include characteristic indicators, among other operations. Wireless link 751 could use various protocols or communication formats as described herein for links 140 or 350, including combinations, variations, or improvements thereof.

Processing system 720 includes storage system 722. Processing system 720 retrieves and executes software 730 from storage system 722. In some examples, processing system 720 is located within the same equipment in which user interface 710, WLAN interface 712, or power system 740 are located. In further examples, processing system 720 comprises specialized circuitry, and software 730 or storage system 722 could be included in the specialized circuitry to operate processing system 720 as described herein. Storage system 722 could include a non-transitory computer-readable medium such as a disk, tape, integrated circuit, server, or some other memory device, and also may be distributed among multiple memory devices.

Software 730 may include an operating system, logs, utilities, drivers, networking software, and other software typically loaded onto a computer system. Software 730 could contain application programs, web server software, firmware, or some other form of computer-readable processing instructions. When executed by processing system 720, software 730 directs processing system 720 to operate as described herein, such as to control the processes of user device 700, or process and display characteristic indicators, among other operations.

In this example, software 730 includes content module 732 and message module 734. It should be understood that a different configuration could be employed, and individual modules of software 730 could be included in different equipment than user device 700. Message module 734 processes messages received by WLAN interface 712. In an example, message module may process requests received into the WLAN transceiver from a wireless transceiver over wireless link 751 to download software. In a further example, message module 734 may instruct processing system 620 to install the software after downloading the software. Message module 734 may also determine messages for deliver to wireless interfaces associated with WLAN. Message module 734 formats messages, such as registration requests, to be transferred through WLAN interface 712. Content module 732 may include software downloaded and installed by message module 734. Content module 732 processes beacon signal packets with characteristic indicators in the headers, or other information, such as encoded information, to determine the associated characteristic information. Content module 732 may graphically display the characteristic information on user interface 710.

Content module 732 may also be configured to process WLAN characteristics such as signal strength that may be included in the beacon signal packet received by the WLAN transceiver. Content module 732 may graphically display WLAN signal strength and WWAN signal strength on the same display, such as in a graphical user interface. In an example, content module 732 may use a single composite icon to show WLAN signal strength modified to account for WWAN signal strength. In an example, an icon can include 4 separate bars, stacked vertically. Horizontal coloring of the bars could indicate WLAN signal strength. For example is 4 bars are shaded, that indicates high WLAN throughput. Vertical stripes through the bars could indicate WWAN signal strength. For example, if only one bar has a vertical stripe, WWAN throughput is low. It should be understood that other graphical representation of signal strength or other characteristic information could be employed.

Power system 740 includes circuitry and a power source to provide power to the elements of user device 700. The power source could include a battery, solar cell, spring, flywheel, capacitor, thermoelectric generator, chemical power source, dynamo, or other power source. In some examples, power system 740 receives power from an external source, such as a wall outlet. Power system 740 also includes circuitry to condition, monitor, and distribute electrical power to the elements of user device 700.

Bus 752 comprises a physical, logical, or virtual communication link, capable of communicating data, control signals, power, and communications, along with other information. In some examples, bus 752 is encapsulated within the elements of user interface 710, WLAN interface 712, processing system 720, or power system 740, and may be a software or logical link, apart from the associated power elements. In other examples, bus 752 includes various communication media, such as air, space, metal, optical fiber, or some other signal propagation path, including combinations thereof. Bus 740 could be a direct link or might include various equipment, intermediate components, systems, and networks.

Referring back to FIG. 1, user device 130 comprises radio frequency (RF) communication circuitry and antenna elements. The RF communication circuitry typically includes amplifiers, filters, modulators, and signal processing circuitry. In many examples, user device 130 includes circuitry and equipment to exchange communications of wireless communication services over a wireless link, request content, and exchange control information for wireless access, among other operations. User device 130 may also include user interface systems, memory devices, non-transient computer-readable storage mediums, software, processing circuitry, or other communication components. User device 130 may be a wireless communication device, computer, subscriber equipment, customer equipment, access terminal, smartphone, mobile wireless telephone, e-book, mobile Internet appliance, wireless network interface card, media player, game console, or some other wireless communication apparatus, including combinations thereof.

Wireless device 120 comprises RF communication and control circuitry, antenna elements, and communication routing equipment and systems. The RF communication circuitry typically includes amplifiers, filters, RF modulators, transceivers, and signal processing circuitry. In many examples, wireless device 120 includes circuitry and equipment to provide a wireless local area network to user devices, route user communications between wireless communication system 110 and user devices such as user device 130, transfer messages such as WWAN characteristic indicators to user devices, and transfer software to user devices, among other operations. Wireless device 120 may also comprise a wireless hotspot, a wireless router, data buffers, data modems, packet routers, servers, memory devices, software, processing systems, cabling, network communication interfaces, physical structural supports, user interfaces, or other communication apparatuses. Wireless device 120 may also comprise transceiver equipment to communicate over a cellular communication link, such as with a base station of a cellular communication system. Wireless device 120 may also include processing systems, computer-readable media, application programs, firmware, or some other form of non-transient computer-readable processing instructions. The non-transient computer-readable media may include a disk, tape, integrated circuit, server, or some other memory device, and also may be distributed among multiple memory devices.

Wireless communication system 110 includes cellular networks, cellular data networks, packet network systems, communication links, routers, gateways, and other associated equipment for routing packet communications, such as Internet protocol (IP) packets, between different endpoints. Additional systems and equipment could communicate through wireless communication system 110, such as content providers, application service providers, web content providers, streaming media providers, voice over packet providers, among other communication service providers and content providers. Packet communications transferred by the various endpoints are transferred by wireless communication system 110 for delivery to destinations associated with the packets. Wireless communication system 110 could also include base stations, base station controllers (BSC), mobile switching centers (MSC), radio node controllers (RNC), call processing systems, authentication, authorization and accounting (AAA) equipment, access service network gateways (ASN-GW), Internet access nodes, telephony service nodes, wireless data access points, or other communication systems, including combinations thereof. Wireless communication system 110 may also comprise optical networks, asynchronous transfer mode (ATM) networks, packet networks, metropolitan-area networks (MAN), Internet systems, or other network topologies, equipment, or systems, including combinations thereof.

WLAN communication signals 140 and WWAN communication signals 141 may be transported using the air or space as the transport media. The transport of WLAN communication signals 140 may use various protocols, such as IEEE 802.11, Wireless Fidelity (Wi-Fi), Worldwide Interoperability for Microwave Access (WiMAX), Internet Protocol (IP), wireless Ethernet, Bluetooth, or some other wireless local area network format, including combinations, improvements, or variations thereof.

The transport of WWAN communications signals 141 may use various communication protocols such as Internet Protocol (IP), Ethernet, Transmission Control Protocol (TCP), Code Division Multiple Access (CDMA), Evolution-Data Optimized (EV-DO), single-carrier radio transmission technology link (1xRTT), Worldwide Interoperability for Microwave Access (WiMAX), Global System for Mobile Communication (GSM), Universal Mobile Telecommunications System (UMTS), Long Term Evolution (LTE), High Speed Packet Access (HSPA), Radio Link Protocol (RLP), Time Division Multiplex (TDM), or some other communication format, including combinations, improvements, or variations thereof.

The communications exchanged between wireless device 120 and user device 130 and communications exchanged between wireless communication system 110 and wireless device 120 may each include many different signals sharing the same link, such as access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

FIGS. 1-7 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a communications system, the method comprising:
   in a wireless device configured to provide wireless access to a wireless wide area network (WWAN) over a wireless local area network (WLAN) established by the wireless device for at least a user device, transferring a WLAN beacon signal from the wireless device for receipt by the user device accessing the WLAN, wherein the WLAN beacon signal comprises packets identifying the WLAN;
   receiving WWAN signals into the wireless device from at least one wireless access node of the WWAN, and identifying at least one of a signal strength and data rate of a wireless access node of the WWAN based on at least the WWAN signals;
   determining WWAN characteristics for insertion into the WLAN beacon signal, wherein the WWAN characteristics are selected from at least one of the signal strength of the wireless access node, the data rate of the wireless access node, and battery status of the wireless device; and
   inserting at least one characteristic indicator into headers of the packets of the WLAN beacon signal indicating the WWAN characteristics.

2. The method of claim 1, further comprising:
   receiving a wireless registration signal into the wireless device from a user device responsive to the WLAN beacon signal;
   in the wireless device, in response to the registration signal, transferring software to the user device, wherein the software is configured to process the WWAN characteristics and display the WWAN characteristics on the user device.

3. The method of claim 2, further comprising:
   in the user device, receiving the WLAN beacon signals with the WWAN characteristics; and
   in the user device, executing the software to process the WWAN characteristics and provide a graphical display to indicate the WWAN characteristics on the user device.

4. The method of claim 3,
   wherein the executing the software to process the WWAN characteristics and provide the graphical display to indicate the WWAN characteristics on the user device comprises executing the software to process the signal strength of the wireless access node to indicate WWAN signal strength on the user device.

5. The method of claim 4, further comprising:
   determining WLAN signal strength; and
   wherein the characteristic indicator further indicates the WLAN signal strength;
   wherein executing the software to process the WWAN characteristics and provide the graphical display to indicate the WWAN characteristics on the user device comprises indicating both the WWAN signal strength and the WLAN signal strength on a first element of the graphical display.

6. The method of claim 1, wherein the packets of the WLAN beacon signal comprise user datagram protocol packets.

7. The method of claim 1, wherein the packets of the WLAN beacon signal comprise media access control layer packets.

8. A wireless device configured to provide wireless access to a wireless wide area network (WWAN) over a wireless local area network (WLAN) established by the wireless device for at least a user device, the wireless device comprising:
- a network interface configured to receive WWAN signals from at least one wireless access node of the WWAN;
- a local interface configured to transfer a WLAN beacon signal comprising packets identifying the WLAN for receipt by the user device accessing the WLAN; and
- a processing system configured to:
  - identify at least one of a signal strength and data rate of a wireless access node of the WWAN based on at least the WWAN signals;
  - determine WWAN characteristics for insertion into the WLAN beacon signal comprising at least one of the signal strength of the wireless access node, the data rate of the wireless access node, and battery status of the wireless device; and
  - direct the local interface to insert at least one characteristic indicator into headers of the packets of the WLAN beacon signal indicating the WWAN characteristics.

9. The wireless device of claim 8, comprising:
- the local interface configured to receive a wireless registration signal from a user device responsive to the WLAN beacon signal; and
- in response to the registration signal, the local interface configured to transfer software to the user device, wherein the software is configured to process the WWAN characteristics and display the WWAN characteristics on the user device.

10. The wireless device of claim 9, wherein user device is configured to receive the WWAN characteristics, and wherein the software in the user device is configured to process the WWAN characteristics to indicate the WWAN characteristics on the user device.

11. The wireless device of claim 10, wherein the software in the user device is configured to indicate the signal strength of the wireless access node on the user device.

12. The wireless device of claim 11, comprising:
- the processing system configured to determine WLAN signal strength, wherein the at least one characteristic indicator further indicates the WLAN signal strength, and wherein the software in the user device configured to indicate both the signal strength of the wireless access node and the WLAN signal strength on a first element of the graphical display.

13. The wireless device of claim 8, wherein the packets of the WLAN beacon signal comprise user datagram protocol packets.

14. The wireless device of claim 8, wherein the packets of the WLAN beacon signal comprise medium access control layer packets.

15. A wireless hotspot device configured to provide wireless access to a wireless wide area network (WWAN) over a wireless local area network (WLAN) established for at least a user device, the wireless hotspot device comprising:
- a network transceiver configured to receive WWAN signals from at least one wireless access node of the WWAN;
- a local transceiver configured to transfer a WLAN beacon signal comprising packets identifying the WLAN, wherein a wireless registration signal is received into the local transceiver from a user device responsive to the WLAN beacon signal, and wherein, in response to the registration signal, software is transferred to the user device; and
- a processing system configured to:
- process the WWAN signals to identify at least one of a signal strength and data rate of a wireless access node of the WWAN based on at least the WWAN signals;
- determine at least one WWAN characteristic for insertion into the WLAN beacon signal comprising at least one of the signal strength of the wireless access node, the data rate of the wireless access node, and battery status of the wireless hotspot device; and
- direct the local transceiver to insert the at least one characteristic indicator into headers of the packets of the WLAN beacon signal indicating the at least one WWAN characteristic,
- wherein the WLAN beacon signal comprising the at least one characteristic indicator is received into the user device, and wherein the software in the user device is configured to determine the at least one WWAN characteristic and provide a graphical display indicating the at least one WWAN characteristic on the user device.

16. The wireless hotspot device of claim 15,
- wherein the software in the user device is configured to indicate the WWAN data rate on the user device.

17. The wireless hotspot device of claim 15, wherein the processing system is configured determine a battery status of the wireless hotspot device to determine the WWAN characteristic; and
- wherein the software in the user device is configured to indicate the battery status on the user device.

18. The wireless hotspot device of claim 15,
- wherein the software in the user device is configured to indicate the signal strength of the wireless access node on the user device.

19. The wireless hotspot device of claim 15, wherein the processing system is further configured to determine a WLAN signal strength and wherein the characteristic indicator further indicates the WLAN signal strength; and
- wherein the software in the user device is configured to indicate the signal strength of the wireless access node and the WLAN signal strength on the user device.

20. The wireless hotspot device of claim 15, wherein the packets of the WLAN beacon signal comprise medium access control layer packets.

* * * * *